US006587152B1

(12) United States Patent
Sharp et al.

(10) Patent No.: US 6,587,152 B1
(45) Date of Patent: Jul. 1, 2003

(54) CAMCORDER MOUNTING AND CONTROL SYSTEM

(75) Inventors: Larry D. Sharp, Tulsa, OK (US); Thomas W. Pogue, Tulsa, OK (US); Jack Farnsworth, Broken Arrow, OK (US)

(73) Assignee: International Police Technologies, Inc., Tulsa, OK (US)

( * ) Notice: Subject to any disclaimer, the term of this patent is extended or adjusted under 35 U.S.C. 154(b) by 0 days.

(21) Appl. No.: 09/175,129

(22) Filed: Oct. 19, 1998

(51) Int. Cl.[7] ........................ H04N 5/225; H04N 7/18; H04N 9/47; B03B 7/26
(52) U.S. Cl. ...................... 348/373; 348/372; 348/376; 348/148; 396/301
(58) Field of Search ................. 348/372, 373, 348/376, 148, 211; 396/301

(56) References Cited

U.S. PATENT DOCUMENTS

| | | | |
|---|---|---|---|
| 3,176,602 A | | 4/1965 | Wilt .............................. 95/86 |
| 4,499,504 A | * | 2/1985 | Edakubo et al. ............ 358/335 |
| 4,789,904 A | * | 12/1988 | Peterson ..................... 348/148 |
| 4,791,531 A | * | 12/1988 | Jessup ........................ 361/736 |
| 4,945,424 A | * | 7/1990 | Hiroki et al. ............... 358/335 |
| 4,949,186 A | | 8/1990 | Peterson ..................... 358/335 |
| 5,012,335 A | | 4/1991 | Cohodar ..................... 358/108 |
| 5,111,289 A | * | 5/1992 | Lucas et al. ................ 358/108 |
| 5,132,800 A | | 7/1992 | Wada et al. ................. 358/209 |

(List continued on next page.)

FOREIGN PATENT DOCUMENTS

| | | | | | |
|---|---|---|---|---|---|
| JP | 08247385 A | * | 9/1996 | .......... | H04N/5/222 |
| JP | 08-280142 | * | 10/1996 | | |
| JP | 09-116975 | * | 5/1997 | ............ | H04Q/9/00 |

Primary Examiner—Ngoc-Yen Vu
Assistant Examiner—Tia M. Harris
(74) Attorney, Agent, or Firm—Fellers, Snider, Blankenship, Bailey & Tippens, P.C.

(57) ABSTRACT

A camcorder mounting and control system comprising a camera interface unit (termed a "camera box") and mounting tray combination. The camera box contains a camera interface circuit board having a power transmit line and battery charging voltage transmit line which function as a bridge between an in-vehicle system control unit and a camcorder. The forward end of the circuit board is provided with an electronic interface which is accessible via a forward end opening on the camera box. The camera box is received in the special mounting tray which includes a quick disconnect adapter board having a first adapter electronic interface complimentary to the circuit board electronic interface and, in electrical communication therewith, a second adapter electronic interface for receiving a cable from the in-vehicle system control unit. The camcorder is easily disconnected from the mounting tray by sliding the camera box toward the rear of the mounting tray. The camera interface circuit board may further include a control circuit electronically connected to the control line interface connections to provide secure camera function control for out-of-vehicle use, a detection circuit electronically connected to the power transmit line to sense the voltage being supplied over the power transmit line, and a transfer circuit for coordinating command and control of the camcorder as between the system control unit and the camera interface control circuit.

12 Claims, 9 Drawing Sheets

U.S. PATENT DOCUMENTS

| | | | | |
|---|---|---|---|---|
| 5,144,661 A | * | 9/1992 | Shamosh et al. | 358/909 |
| 5,282,182 A | * | 1/1994 | Kreuzer et al. | 348/148 |
| 5,341,171 A | | 8/1994 | Mori et al. | 348/373 |
| 5,438,362 A | * | 8/1995 | Tabuchi | 348/211 |
| 5,455,625 A | | 10/1995 | Englander | 348/375 |
| 5,465,117 A | * | 11/1995 | Ide et al. | 348/373 |
| 5,469,211 A | * | 11/1995 | Maruichi et al. | 348/211 |
| 5,565,941 A | | 10/1996 | Kaneco | 396/177 |
| 5,568,198 A | * | 10/1996 | Sakurai et al. | 348/372 |
| 5,640,207 A | | 6/1997 | Rahmouni et al. | 348/374 |
| 5,667,408 A | | 9/1997 | Broschard, III et al. | 439/630 |
| 5,677,979 A | * | 10/1997 | Squicciarini et al. | 386/46 |
| 5,959,671 A | * | 9/1999 | Etoh et al. | 348/373 |
| 6,002,326 A | * | 12/1999 | Turner | 340/426 |
| 6,111,609 A | * | 8/2000 | Stevens | 348/372 |
| 6,151,067 A | * | 11/2000 | Suemoto et al. | 348/207 |
| 6,163,338 A | * | 12/2000 | Johnson et al. | 348/148 |
| 6,405,049 B2 | * | 6/2002 | Herrod et al. | 455/517 |

* cited by examiner

CAMCORDER MOUNTING AND CONTROL SYSTEM

BACKGROUND OF THE INVENTION

1. Field of the Invention

This invention relates generally to audiovisual recording equipment, and, more particularly, to vehicle-mounted observation and recording systems for use in connection with law enforcement activities.

2. Background

Most persons are now familiar with the use by law enforcement personnel of in-car audiovisual recording devices. Such devices have proved useful in documenting traffic stops and other law enforcement activities. A typical in-car dash-mounted system includes a camcorder electrically connected by a cable to a system control unit. The system control unit is mounted in an out-of-the-way location in the vehicle and is interfaced with an operator accessible control panel. The control panel contains switches for managing the operation of the device.

To maintain the integrity of event recordings, especially for use in connection with criminal prosecutions and court proceedings, many systems incorporate security controls over certain camera functions. The security controls are administered by the system control unit. For example, to prevent recording over a previously taped segment the system control unit may be set to disable the camcorder's rewind function. Other security control options are typically incorporated into the logic of the system control unit.

Limitations of the conventional systems become apparent when the camcorder is sought to be removed from the dash mount to record events away from the vehicle, such as accident or crime scenes, searches and seizures and the like. Many systems are exclusively for in-car use, and those systems that purport to have a removable camcorder are incapable of being effectively utilized outside the vehicle. One problem arises in detaching the camera from the dash mount and disconnecting it from the system control unit. When time is of the essence, it is frustrating for the operator to have to disengage the camcorder from an unfriendly dash mount coupling and to unscrew one or more cables connecting the camcorder to the system control unit. Once disconnected, the operator often finds that the camcorder's battery is low or completely discharged. To further complicate matters, disconnecting the camcorder from the system control unit disables the unit's supervisory control over camera functions, thus compromising the integrity of the recording.

It is thus an object of the present invention to provide a camcorder mounting and control system which allows for the quick and easy disconnection of the camcorder from the dash mount and from the system control unit.

It is a further object of the invention that supervisory control over camera functions be maintained even after the camcorder is disconnected from the dash mount.

It is another object of the invention to ensure that the camcorder's battery remains charged for out-of-vehicle use.

SUMMARY OF THE INVENTION

These and other objects are achieved in a camcorder mounting and control system comprising a camera interface unit (termed a "camera box") and mounting tray combination. The camera box contains a camera interface circuit board having a power transmit line and a battery charging voltage transmit line which each function as a bridge between an in-vehicle system control unit and a camcorder. The forward end of the circuit board is provided with a sliding fit electronic interface, e.g., an edge connector, which is accessible via a forward end opening on the camera box. The camera box is received in the special mounting tray which includes a quick disconnect adapter board having a first adapter electronic interface, e.g., an edge connector, complimentary to the circuit board electronic interface and, in electronic communication therewith, a second adapter electronic interface, e.g., a pin socket, for receiving a cable from the in-vehicle system control unit. The camcorder is easily disconnected from the mounting tray by sliding the camera box toward the rear of the mounting tray to disengage the circuit board electronic interface from the first adapter electronic interface.

The camera interface circuit board further includes control line interface connections to the camcorder, a control circuit electronically connected to the control line interface connections to provide secure camera function control for out-of-vehicle use, a detection circuit electronically connected to the power transmit line to sense the voltage being supplied over the power transmit line, and a transfer circuit for coordinating command and control of the camcorder as between the system control unit and the camera interface control circuit.

The transfer circuit is capable of assuming at least two positions in response to the detected voltage transmission across the power transmit line. In response to a first condition, namely the transmission across the power transmit line of a normal operating voltage supplied through the system control unit, the transfer circuit assumes a first position bypassing the control circuit on the camera interface circuit board so that camera function control is managed by signals emanating from the system control unit and passing over the control line interface connections to the camcorder. In response to a second condition, namely the lack of any appreciable voltage across the power transmit line, meaning that power is not being supplied to the camcorder through the system control unit, such as would be the case if the camcorder has been removed from the vehicle for exterior use, the transfer circuit assumes a second position enabling the on-board control circuit.

The on-board control circuit includes means for maintaining the secure control of camera functions when the camcorder is disconnected from the mounting tray, i.e., when the camcorder is being used outside the vehicle. Electronically connected to the control circuit are a power control switch and a multi-position camera function key switch, each located on the camera box for easy operator accessibility. When the camcorder is in the mounting tray and power is being supplied through the vehicle system control unit these switches are disabled, as, per the transfer circuit, the vehicle system control unit is then commanding camera function. The switches on the camera box are enabled by the transfer circuit once the detection circuit recognizes by a drop in voltage across the power transmit line that the camcorder has been removed from the mounting tray. The control circuit has alternate camera function control circuitry components responsive to the position of the camera box key switch. In the most preferred embodiment of the invention, the key switch has three positions. In response to the position of the key switch, the control circuit limits the operator selectable camera functions to, alternatively, a record only mode, a record/eject mode, and a playback mode. The key is removable from the key switch in any position so that an operator's supervisor may select the appropriate mode and "lock" it in by removing the key.

Once the camcorder is removed from the mounting tray, power is provided by the camcorder battery. Pressing the power control switch on the camera box turns on the camcorder. Battery charging circuitry in the system control unit operable during in-vehicle use ensures that the battery is always charged for out-of-car use.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring first to FIGS. 1–5, there is shown a vehicle observation and audiovisual recording system 10, and components thereof. The system 10 includes a camcorder mounting and control assembly constructed in accordance with the preferred embodiment of the present invention which provides for the quick connection and disconnection of a camcorder 12 from a vehicle dash mount 14 and further provides for the secure control of camera functions for out-of-vehicle use. The mounting and control assembly comprises a camera box 16 attached to the bottom of the camcorder 12 and a mounting tray 18 for receiving and holding the camera box 16 in a recording position on the dash mount 14. The mounting tray 18 is rotatably affixed by fastener 20 to the dash mount 14. Extending laterally from each side of the camera box 16 are two mounting pins 22 which are receivable in a pair of slots 24 on the mounting tray 18. The camera box 16 is set onto the mounting tray 18 so that the mounting pins 22 drop into the slots 24, whereupon the camera box 16 is pushed forward into a locking engagement.

Figure 2:
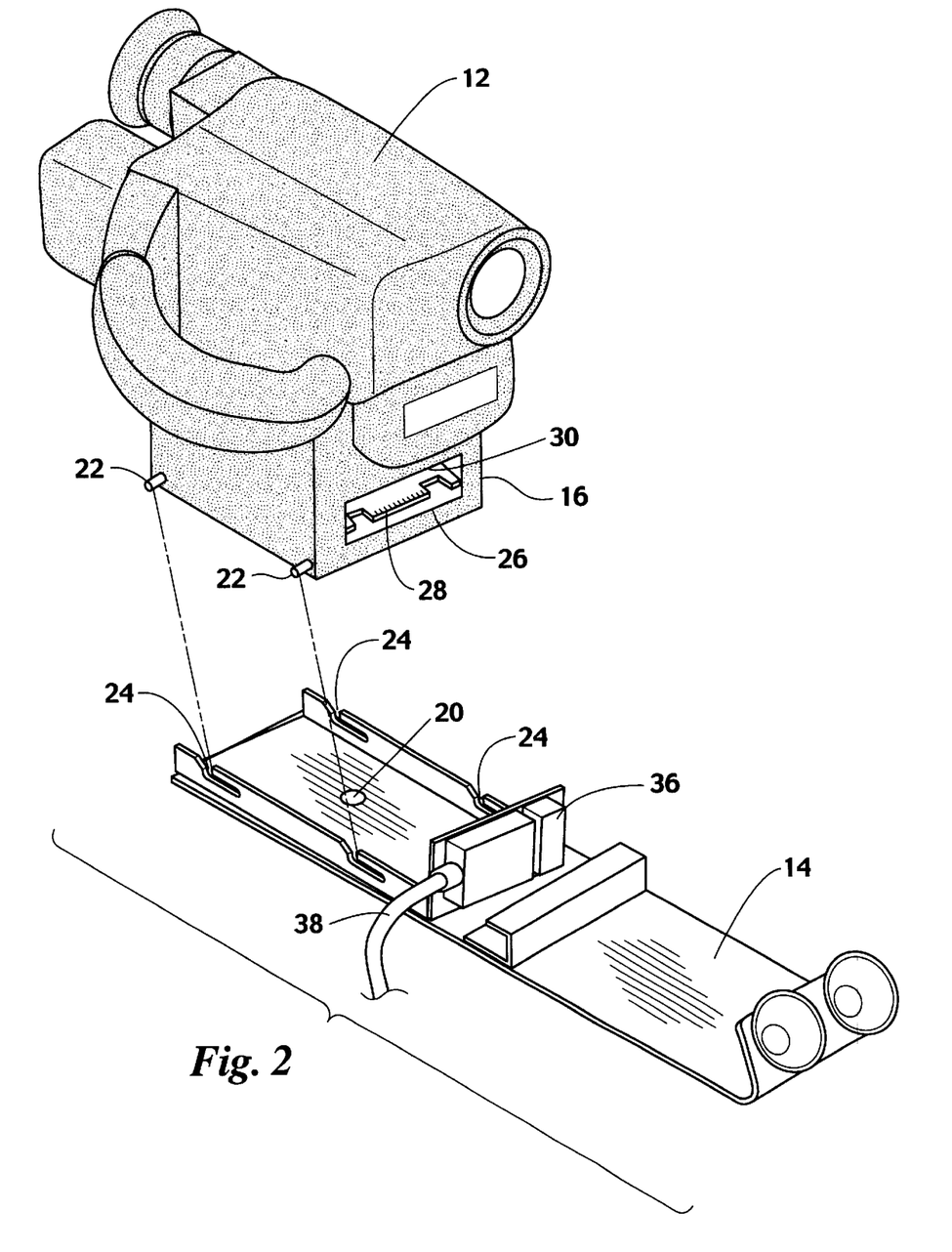
FIG. 2 is an exploded perspective view of the preferred camcorder mounting assembly.
Figure 3:
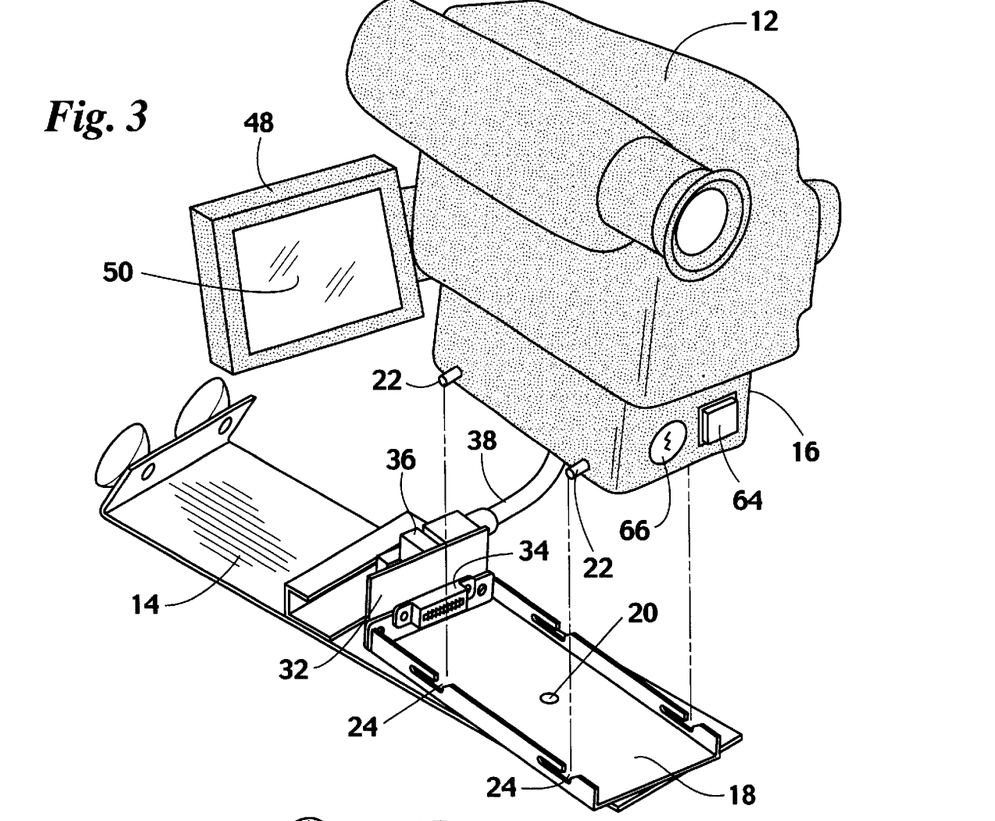
FIG. 3 is a perspective view of the preferred camcorder dash mount and mounting tray.
Figure 4:
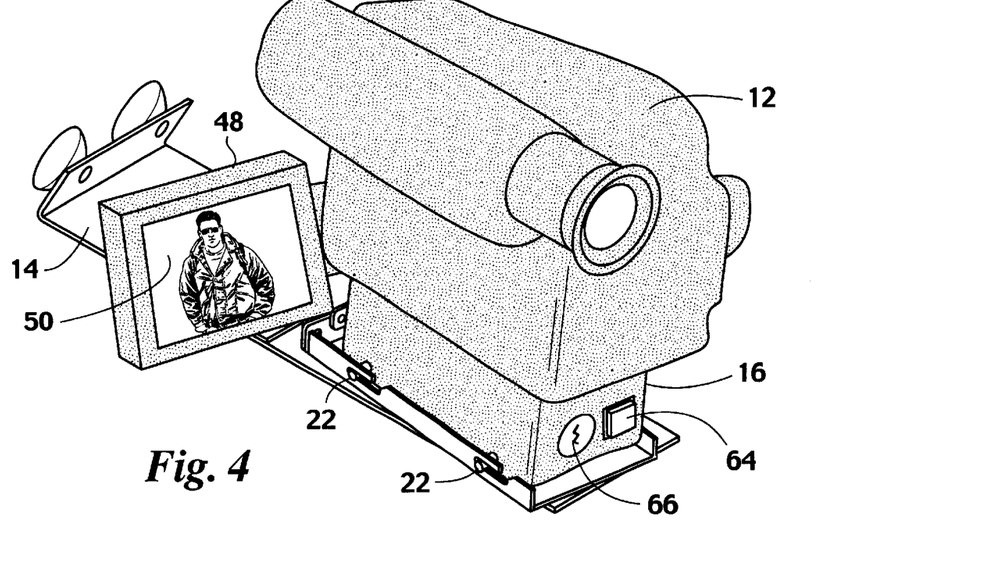
FIG. 4 is a perspective view of the preferred camcorder mounting assembly in its operative arrangement.
Figure 5:
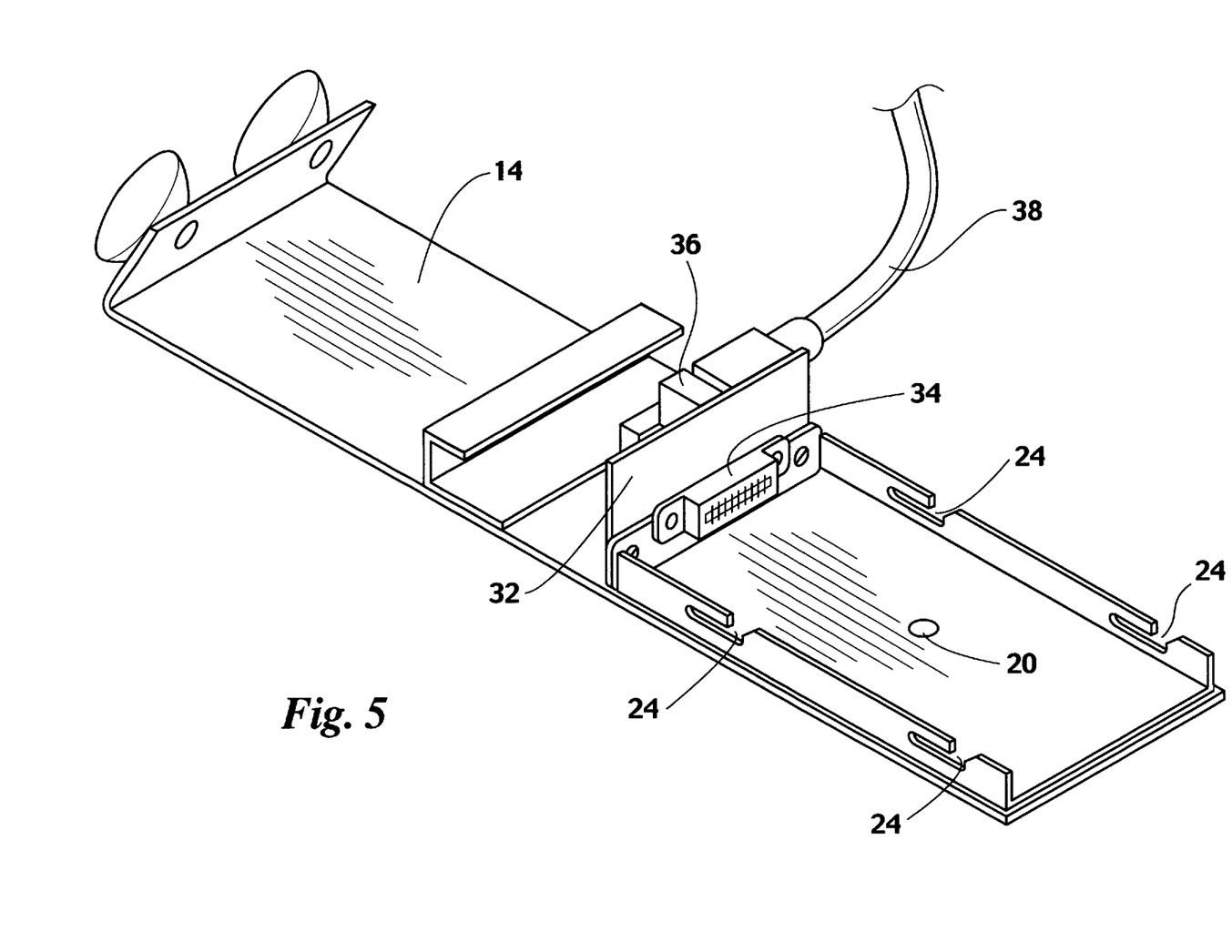
FIG. 5 is another perspective view of the preferred camcorder mounting assembly.

As shown more particularly in FIG. 2, the camera box 16 has a forward end opening 26 to provide access to a sliding fit electronic interface, such as the illustrated edge connector 28, provided on the forward periphery of a camera interface circuit board 30. The circuit board 30 contributes to the achievement of the objects of the present invention by facilitating necessary electrical connections and electronic communications. As described in detail below, the circuit board 30 has a power transmit, charging voltage and control line interface connections to the camcorder 12, a detection circuit electronically connected to the power transmit line to sense the voltage being supplied over the power transmit line, a control circuit electronically connected to the control line interface connections to provide secure camera function control for out-of-vehicle use, and transfer circuitry for coordinating command and control of the camcorder 12.

Figure 6:
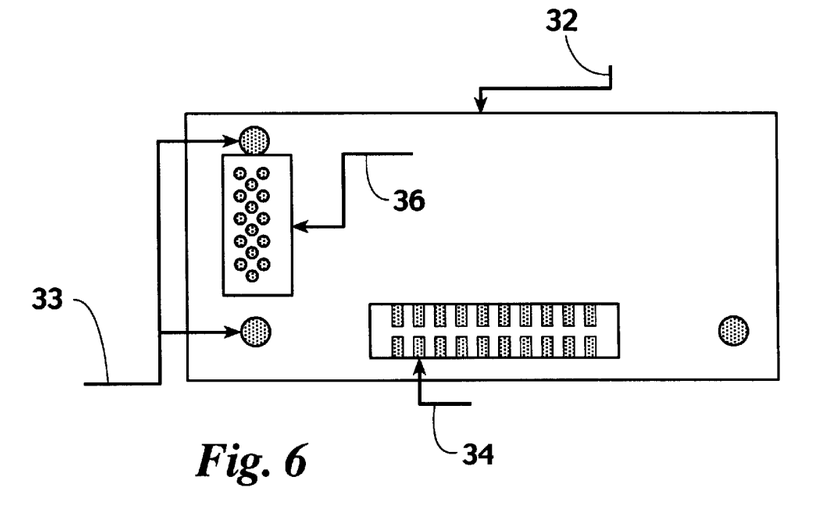
FIG. 6 is a plan view block diagram of the preferred quick disconnect adapter board.

With further reference to FIG. 6, the mounting tray 18 includes at its forward end a quick disconnect adapter board 32, such as a double sided circuit board, having a first adapter electronic interface, such as female edge connector 34, complementary to the circuit board electronic interface 28. In the preferred embodiment of the invention the interfaces 28, 34 are 20 pin edge connectors. On the side of the adapter board 32 opposite edge connector 34, and in an electrical communication therewith, is a second adapter electronic interface, preferably a high density 15 pin socket 36, for receiving a connection cable 38. The adapter board 32 is affixed to the mounting tray 18, utilizing mounting holes 33. An electronic connection is achieved between the edge connector 28 of the circuit board 30 and the edge connector 34 of the adapter board 32 when the camera box 16 is pushed forward into locking engagement with the mounting tray 18.

The camcorder 12 is easily disconnected from the mounting tray 18 as all that is required is to pull the camera box 16 toward the rear of the mounting tray 18 to disengage the edge connectors and then lift the camera box 16 up and away to release the mounting pins 22 from the slots 24. The in-camera battery (graphically illustrated in FIG. 9 as block 88) should be fully charged per the battery charging circuitry 56.

The remaining components of the system 10 include a system control unit 40 which houses control electronics for managing the system for in-vehicle use. The system control unit 40 is generally placed in one of several out-of-the-way locations in the car. The control electronics for the system control unit 40 are located on a modular style printed circuit board to allow for the easy replacement of the primary system electronics. The system 10 is powered by an accessory plug (not shown) that will operate from a standard automotive vehicle battery 42 at 10.8 to 16.5 volts DC, negative ground. Current drain on the vehicle's electrical system does not exceed 5.0 amps. Connection cable 38 electronically interfaces the system control unit 40 with the adapter board 32 and edge connector 34. The system control unit 40 is also electronically interfaced by a cable 44 with a control console 46. The control console 46 is mounted within easy reach of the operator and contains controls to manipulate various camera functions when the system 10 is operating in the in-vehicle mode. The camcorder 12 may be one of any number of off-shelf camcorders. Particularly preferred is a Sony "HandyCam Vision" 64× Digital Zoom 8 mm cassette camcorder. This model of camcorder has a pull-out viewer 48 with a 2.5 inch color LCD monitor 50. The LCD monitor 50 is particularly useful when the camcorder 12 is being used for exterior recording operations.

Figure 7:
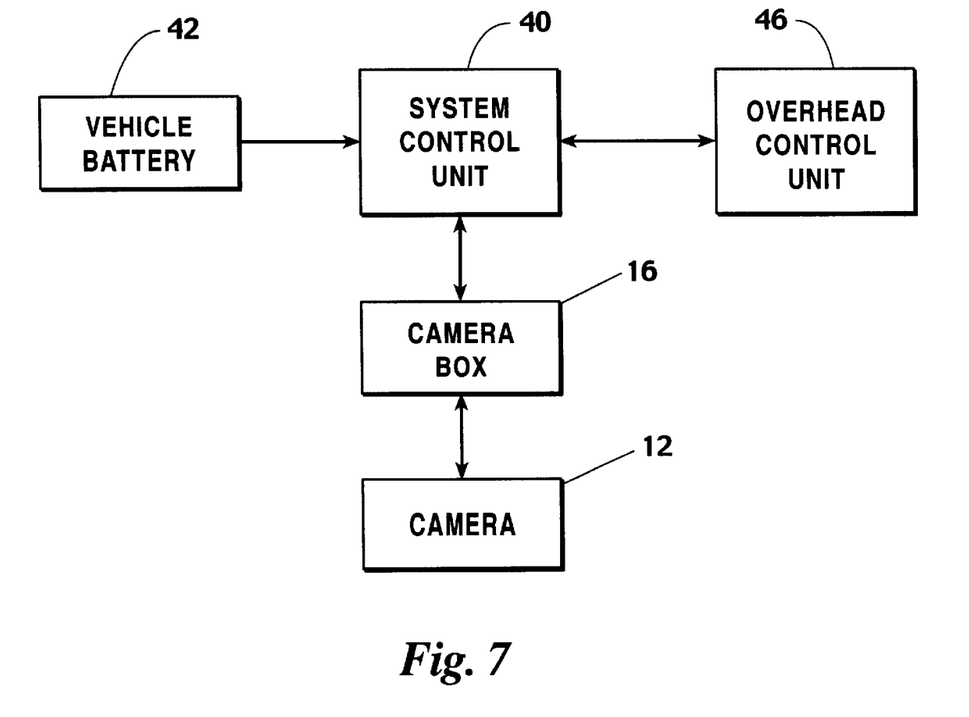
FIG. 7 is a system interface block diagram of the preferred embodiment of the invention.

FIG. 7 shows an interface block diagram of the system components. The vehicle battery 42 provides power to the system control unit 40 which is interfaced through camera box 16 to camcorder 12. In-car commands are provided by the operator to the system control unit 40 via the control console 46, which may be an overhead console or a between seat pedestal console. The control console 46 contains controls for such typical features as manual record activation, a light bar interrupt switch to disable automatic system activation triggered by use of the light bar, an RF activation override switch to disable a system activation caused by stray RF signals, manual focus control to allow the operator to switch to a manual focus mode for night operations, an internal/external microphone position selection switch, a covert audio on/off switch, and a camera function key switch to limit the operator's ability to manipulate certain camera functions. These features are well known for in-vehicle systems.

Turning now to FIGS. 8–11 and a more detailed examination of the system electronics, another aspect of the present invention is the coordination of system control as between the system control unit 40 and the camera interface circuit board 30. The adapter board pin socket 36, which receives the connection cable 38 from the system control unit 40, electronically interfaces with the adapter board edge connector 34 to establish control lines, power for the camcorder 12 and a battery charge voltage for the camcorder battery 88. The edge connector 28 of the camera interface circuit board 30 serves as a connector interface between the system control unit 40 and the camcorder 12. Power from the vehicle battery 42 is regulated by the system control unit 40 and is then passed through the adapter board 32 to the camera interface circuit board 30 and on to the camcorder 12 via power line 52 and power connection 54. In a like fashion, a battery charge voltage generated by battery charging circuitry 56 in the system control unit 40 is passed through the adapter board 32 to the camera interface circuit board 30 and on to the camcorder 12 via voltage line 58 and power connection 54. Thus, when the camera box 16 is in the mounting tray 18 the camcorder 12 runs on vehicle power and the camcorder battery is charged.

Figure 8:
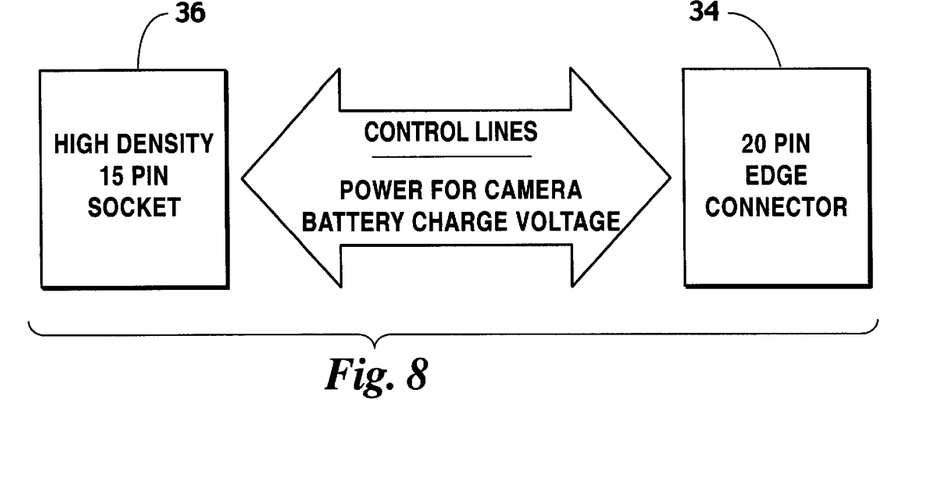
FIG. 8 is an electrical block diagram of the quick disconnect feature of the preferred embodiment of the invention.
Figure 9:
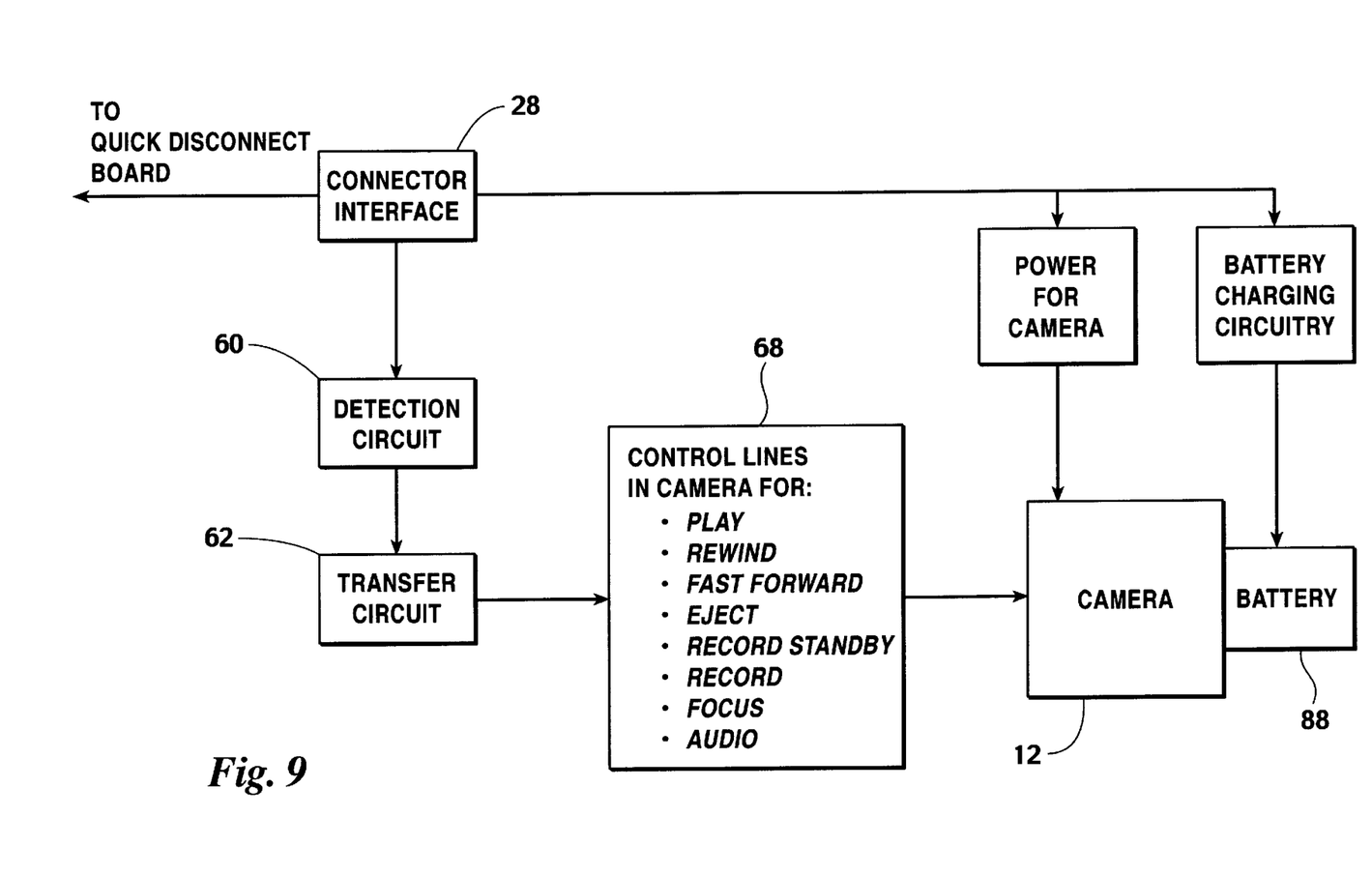
FIG. 9 is a camera interface assembly block diagram of the preferred embodiment of the invention.
Figure 10:
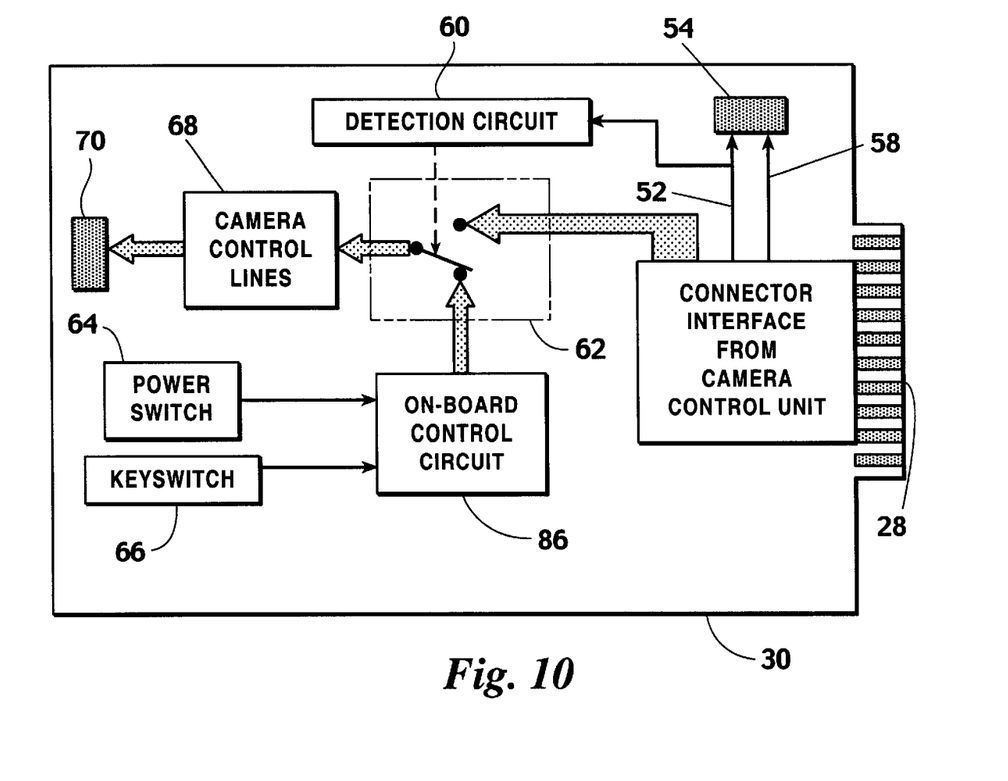
FIG. 10 is a plan view block diagram of the preferred camera box circuit board.

A detection circuit 60 located on the camera interface circuit board 30 senses whether a normal operating voltage is being provided via the system control unit 40 to power line 52. A signal indicative of the detected voltage is fed to a transfer circuit 62. If a normal in-vehicle operating voltage condition is detected, the transfer circuit 62 assumes a first position which electronically connects the system control unit 40 with the camcorder 12 and concomitantly disables a power switch 64 and a camera function key switch 66 located on the camera box 16. Thereafter, the camcorder 12 is controlled by the system control unit 40 whose signals are propagated through a number of camera control lines 68 on the camera interface circuit board 30 to a camcorder interface connector 70, such as a ribbon connector. The interface connector 70 electronically connects the control lines 68 from the circuit board 30 to the in-camera camcorder control lines. The control lines 68 include line connections for various camera finctions, such as record, eject, standby, focus, audio input, and the playback functions of play, rewind, and fast forward. In this manner, when the camera box 16 is in the mounting tray 18 the camcorder operations are managed by the system control unit 40.

Figure 1:
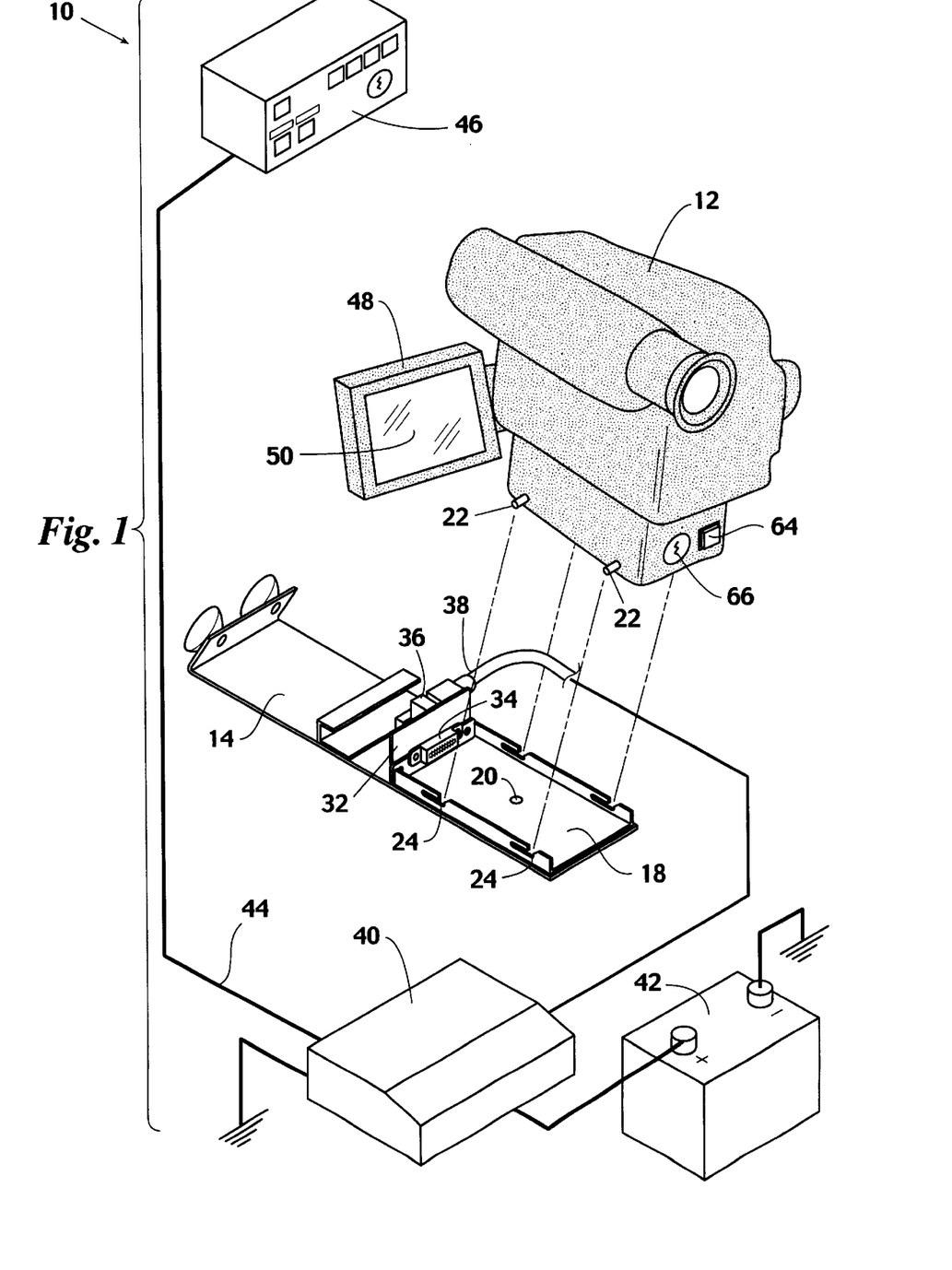
FIG. 1 is a perspective view of a vehicle-mounted observation and recording system incorporating the preferred embodiment of the present invention.

With attention now directed to FIG. 1, when the system 10 is turned on, which may be from a manual activation signal from a power button, a light bar activation signal or from an RF activation signal, and the camera box 16 is in the mounting tray 18, regulated power is supplied to the camcorder 12 as indicated per block 72. According to the position of an overhead key switch (block 74) on the control console 46, certain camera function security features are selected. For example, a first key switch position may correspond to a playback mode 76 which allows the operator only to eject, play, rewind or fast forward the tape in the camcorder 12. A second key switch position may correspond to a record mode 78 which limits the operator to a record function and focus control. Consequently, the integrity of the system 10 may be maintained through restricting the operator's ability to utilize only certain camera functions. The system electronics in the system control unit 40 also provides, as indicated, for the selection of various audio functions. The control console 46 typically includes a selection switch for covert microphones (block 80), an internal vehicle microphone (block 82), and a wireless transmitter (block 84).

If the detected voltage across the power transmit line 52 indicates a second condition, namely negligible voltage transmission, such as would be the case when the camcorder 12 has been removed from the mounting tray 18 for external use, the transfer circuit 62 assumes a second position which enables a control circuit 86 located on the camera interface circuit board 30 by electronically interfacing the control circuit 86 with the camera control lines 68. The control circuit 86 is responsive to the power switch 64 and the camera function key switch 66 located on the camera box 16. Thereafter, the camcorder 12 is controlled by the on-board control circuit 86 whose signals are propagated through the camera control lines 68 and the camcorder interface connector 70 and to the camcorder 12.

Figure 11A:
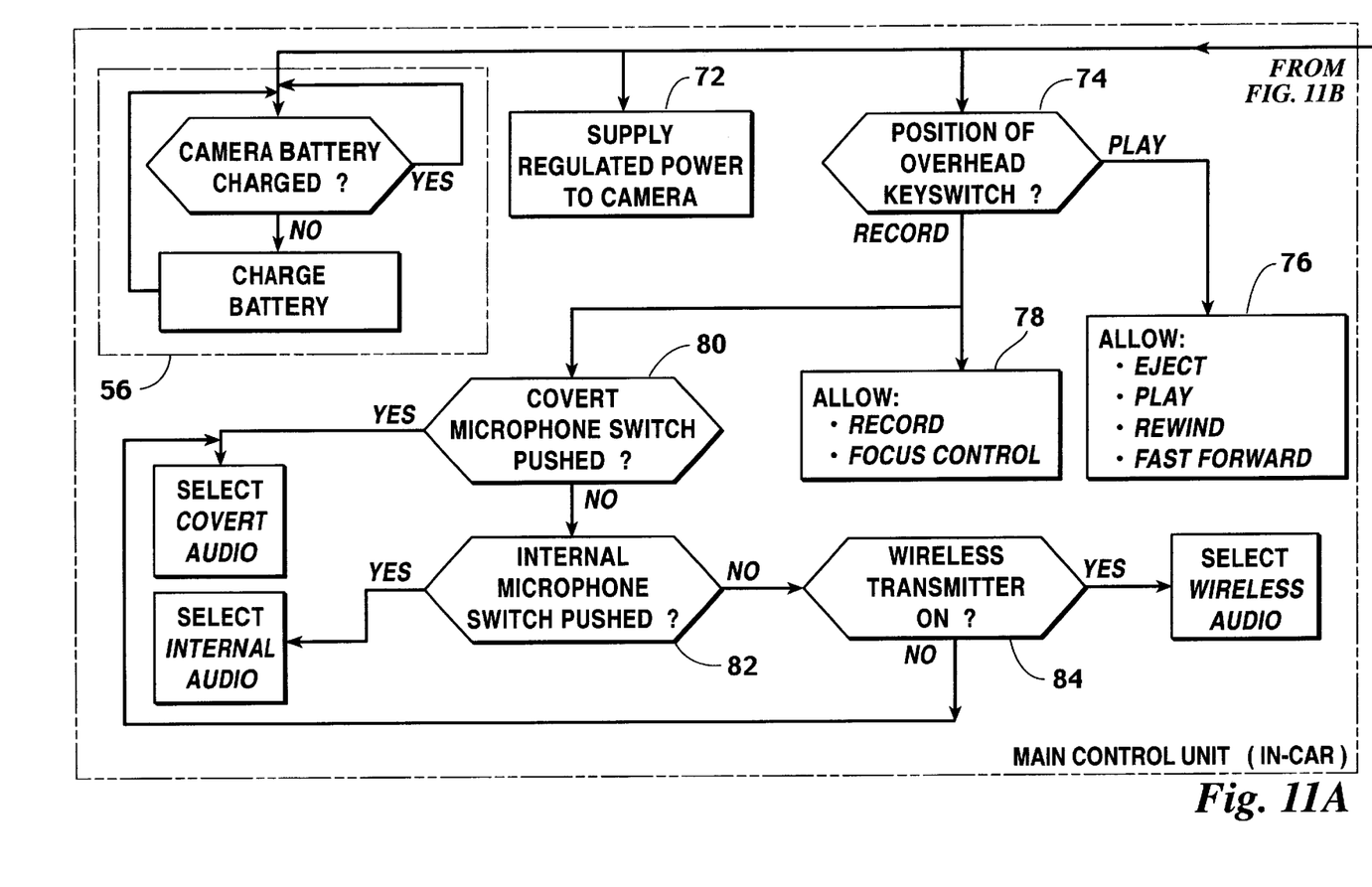
FIG. 11 is an operation flowchart of the system circuitry of the preferred embodiment of the invention.
Figure 11B:
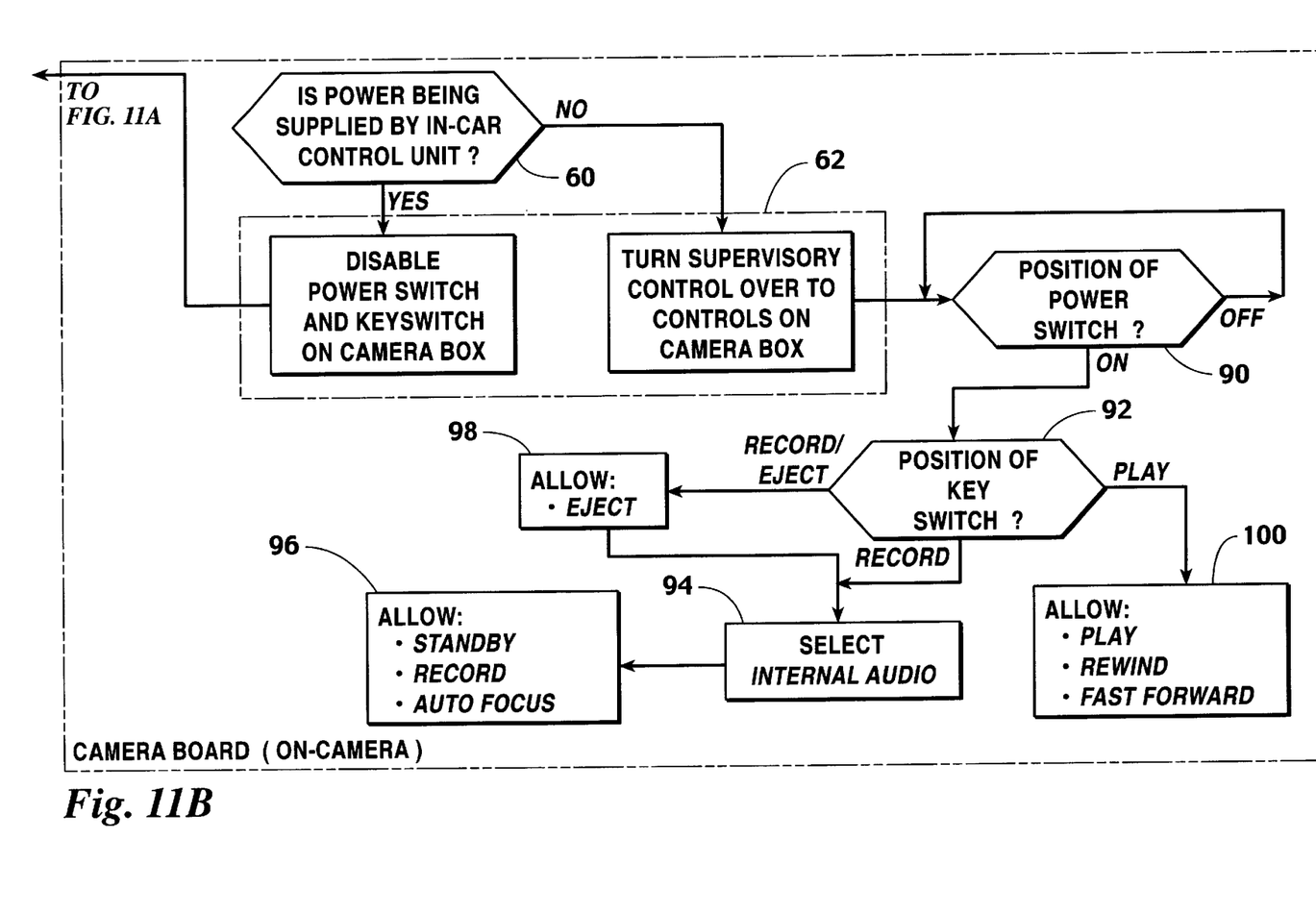

Still with reference to FIG. 11, when the power switch 64 on the camera box 16 is in an "on" position (see block 90), the camcorder 12 remains operable in one of several selectable security modes. The position of the key switch 66 determines the particular mode selected as indicated in block 92. In the most preferred embodiment of the invention, the control circuit 86 limits the operator selectable camera functions to, alternatively, a record only mode, a record/eject mode, and a playback mode. The key to the key switch is removable so that a supervisor may set the desired camera function mode prior to a patrol to prevent the operator from accidentally or intentionally engaging camera functions which may jeopardize the integrity of the recording.

In the record mode, the control circuit 86 allows the operator to select internal audio options (block 94), and to operate the record, standby and auto focus options (block 96). In the record/eject mode, the control circuit 86 further enables the camera's eject circuitry (block 98). In the playback mode, the control circuit 86 allows the operator to play, rewind, and fast forward the tape (block 100). The control circuit 86 communicates the selected and available commands to the internal system electronics of the camcorder 12 through the camera interface circuit board control lines 68 and the interface connector 70.

It can thus be appreciated that the present invention facilitates the tactical operations of law enforcement agencies by providing a vehicle observation and audiovisual recording system having a readily detachable camcorder and which maintains secure camera function control for out-of-vehicle use, such as for drug interdictions, searches and seizures, domestic violence investigations, accident investigations, field training, surveillance, and DUI enforcement. It also benefits law enforcement administration by reducing officer misconduct liabilities, pursuit liabilities, prosecution costs and overtime pay for court time, as well as increasing guilty plea ratios, articulating probable cause and assisting in internal investigations.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A camcorder mounting and control system providing for the quick connection and disconnection of a camcorder from a vehicle dash mount, comprising:

a camera box for attachment to the camcorder, the camera box containing a camera interface circuit board and having an opening to provide access to an electronic interface on the circuit board, the circuit board having power and charging voltage interface connections to the camcorder; and a mounting tray for receiving the camera box, the mounting tray including a quick disconnect adapter board having a first adapter electronic interface complimentary to the circuit board electronic interface and, in electrical communication therewith, a second adapter electronic interface for receiving a cable from an in-vehicle system control unit, wherein the second adapter electronic interface is a high density pin socket, and whereby power and charging voltage from the system control unit is carried by the circuit board to the camcorder.

2. A camcorder mounting and control system providing for the quick connection and disconnection of a camcorder from a vehicle dash mount, comprising:

a camera box for attachment to the camcorder, the camera box containing a camera interface circuit board and having an opening to provide access to an electronic interface on the circuit board, the circuit board having power and charging voltage interface connections to the camcorder;

a mounting tray for receiving the camera box, the mounting tray including a quick disconnect adapter board having a first adapter electronic interface complimentary to the circuit board electronic interface and, in electrical communication therewith, a second adapter electronic interface for receiving a cable from an in-vehicle system control unit, whereby power and charging voltage from the system control unit is carried by the circuit board to the camcorder; and wherein the adapter board is a double-sided circuit board.

3. A camcorder mounting and control system providing for the quick connection and disconnection of a camcorder from a vehicle dash mount and for secure control of camera functions independent of whether the camcorder is in the dash mount, comprising:

a camera box for attachment to the camcorder, the camera box containing a camera interface circuit board and having an opening to provide access to an electronic interface on the circuit board, the circuit board having power and control line interface connections to the camcorder, a detection circuit electronically connected to the power line to sense the voltage being transmitted thereover, a control circuit electronically connected to the control line interface connections to provide secure camera function control for out-of-vehicle use, and a transfer circuit electronically connected to the detection circuit to receive a signal indicative of the detected voltage transmission across the power line and, if negligible voltage transmission is detected, to thereafter assume a position electronically connecting the control circuit with the control line interface connections; and a mounting tray for receiving the camera box, the mounting tray including a quick disconnect adapter board having a first adapter electronic interface complimentary to the circuit board electronic interface and, in electrical communication therewith, a second adapter electronic interface for receiving a cable from an in-vehicle system control unit, whereby power and charging voltage from the system control unit is carried by the circuit board to the camcorder.

4. The camcorder mounting and control system according to claim 3 wherein the control line interface connections include control line connections for one or more of the camcorder functions selected from the group consisting of play, rewind, fast forward, eject, standby, record, focus and the transmission of audio signals.

5. The camcorder mounting and control system according to claim 3 wherein the camera box further comprises a power control switch and a multi-position camera function key switch, each switch being operator accessible and being electrically connected to the control circuit.

6. The camcorder mounting and control system according to claim 5 wherein the key switch has a first position, a second position, and a third position, and wherein the control circuit has alternate camera function control circuitry components responsive to the position of the key switch.

7. The camcorder mounting and control system according to claim 6 wherein, in response to the position of the key switch, the control circuit limits the operator selectable camera functions to, alternatively, a record only mode, a record/eject mode, and a playback mode.

8. A vehicle observation and audiovisual recording system with secure camera function control for both in-vehicle and out-of-vehicle use, comprising:

a camcorder having audio and visual recording capabilities;

a dash mount for holding the camcorder in an operable position for in-vehicle use;

a system control unit for managing the system for in-vehicle use;

a control console electrically interfaced with the system control unit provided with operator switch controls for in-vehicle use;

a camera box for attachment to the camcorder, the camera box containing a camera interface circuit board and having an opening to provide access to an electronic interface on the circuit board, the circuit board having power and control line interface connections to the camcorder, a detection circuit electronically connected to the power line to sense the voltage being transmitted thereover, a control circuit electronically connected to the control line interface connections to provide secure camera function control for out-of-vehicle use, and a transfer circuit electronically connected to the detection circuit to receive a signal indicative of the detected voltage transmission across the power line and, in response thereto, assume at least two positions, namely, in response to the detection of a normal operating voltage supplied through the system control unit to assume a first position electronically connecting the system control unit with the control line interface connections, or, in response to the detection of negligible voltage transmission across the power line to assume a second position electronically connecting the control circuit with the control line interface connections; and a mounting tray for receiving the camera box, the mounting tray including a quick disconnect adapter board having a first adapter electronic interface complimentary to the circuit board electronic interface and, in electrical communication therewith, a second adapter electronic interface for receiving a cable from the in-vehicle system control unit, whereby power and charging voltage from the system control unit is carried by the circuit board to the camcorder.

9. The vehicle observation and audiovisual recording system according to claim 8 wherein the control line interface connections include control line connections for one or more of the camcorder functions selected from the group consisting of play, rewind, fast forward, eject, standby, record, focus and the transmission of audio signals.

10. The vehicle observation and audiovisual recording system according to claim 8 wherein the camera box further comprises a power control switch and a multi-position camera function key switch, each switch being operator accessible and being electrically connected to the control circuit.

11. The vehicle observation and audiovisual recording system according to claim 10 wherein the key switch has a first position, a second position, and a third position, and wherein the control circuit has alternate camera function control circuitry components responsive to the position of the key switch.

12. The vehicle observation and audiovisual recording system according to claim 11 wherein, in response to the position of the key switch, the control circuit limits the operator selectable camera functions to, alternatively, a record only mode, a record/eject mode, and a playback mode.

* * * * *